(12) United States Patent
Hangleiter

(10) Patent No.: US 8,246,280 B2
(45) Date of Patent: Aug. 21, 2012

(54) APPARATUS FOR CHUCKING A TOOL OR WORKPIECE HAVING A COLLET

(75) Inventor: Eugen Hangleiter, Hermaringen (DE)

(73) Assignee: ROEHM GmbH, Sontheim (DE)

( * ) Notice: Subject to any disclaimer, the term of this patent is extended or adjusted under 35 U.S.C. 154(b) by 1161 days.

(21) Appl. No.: 12/066,393

(22) PCT Filed: Jun. 14, 2006

(86) PCT No.: PCT/DE2006/001016
§ 371 (c)(1),
(2), (4) Date: Mar. 11, 2008

(87) PCT Pub. No.: WO2007/031045
PCT Pub. Date: Mar. 22, 2007

(65) Prior Publication Data
US 2008/0252023 A1    Oct. 16, 2008

(30) Foreign Application Priority Data
Sep. 13, 2005 (DE) .......................... 10 2005 043 722
Oct. 15, 2005 (DE) .......................... 10 2005 049 377

(51) Int. Cl.
*B23C 5/26* (2006.01)
(52) U.S. Cl. ....................................... 409/233; 279/2.11
(58) Field of Classification Search .......... 409/231–234; 279/2.1–2.11; *B23C 5/26*
See application file for complete search history.

(56) References Cited

U.S. PATENT DOCUMENTS

| | | | | | |
|---|---|---|---|---|---|
| 1,285,763 | A | * | 11/1918 | Markey | 279/2.03 |
| 1,293,525 | A | * | 2/1919 | Osborn | 279/2.12 |
| 1,519,337 | A | * | 12/1924 | Schlaupitz | 279/106 |
| 2,261,380 | A | * | 11/1941 | Jelinek et al. | 279/146 |
| 2,493,926 | A | * | 1/1950 | Petsche | 279/51 |
| 2,548,096 | A | * | 4/1951 | Bryant et al. | 279/2.11 |
| 3,568,566 | A | | 3/1971 | Weidig | |
| 4,553,886 | A | * | 11/1985 | Vasilchenko et al. | 409/233 |
| 4,668,137 | A | | 5/1987 | Iwakura | |
| 5,193,954 | A | * | 3/1993 | Hunt | 409/233 |
| 5,391,027 | A | * | 2/1995 | Green | 409/233 |

FOREIGN PATENT DOCUMENTS

| | | |
|---|---|---|
| DE | 82 15 293.4 | 9/1982 |
| EP | 1 308 231 | 5/2003 |
| JP | 07299615 A * | 11/1995 |
| JP | 10235503 A * | 9/1998 |
| JP | 10235504 A * | 9/1998 |
| JP | 10235505 A * | 9/1998 |
| JP | 2001212707 A * | 8/2001 |

* cited by examiner

*Primary Examiner* — Daniel Howell
(74) *Attorney, Agent, or Firm* — Andrew Wilford

(57) ABSTRACT

The invention relates to an apparatus for holding a workpiece (2) or tool having a tapered collar (1) or the like and having a pull-back rod (4) axially shiftable in a body (3) for actuating a chuck head (6) cooperating with jaws (5). The axial position of the pull-back rod (4) is maintained in a holding position without utilizing the force of a tension spring by a self-locking mechanism.

16 Claims, 1 Drawing Sheet

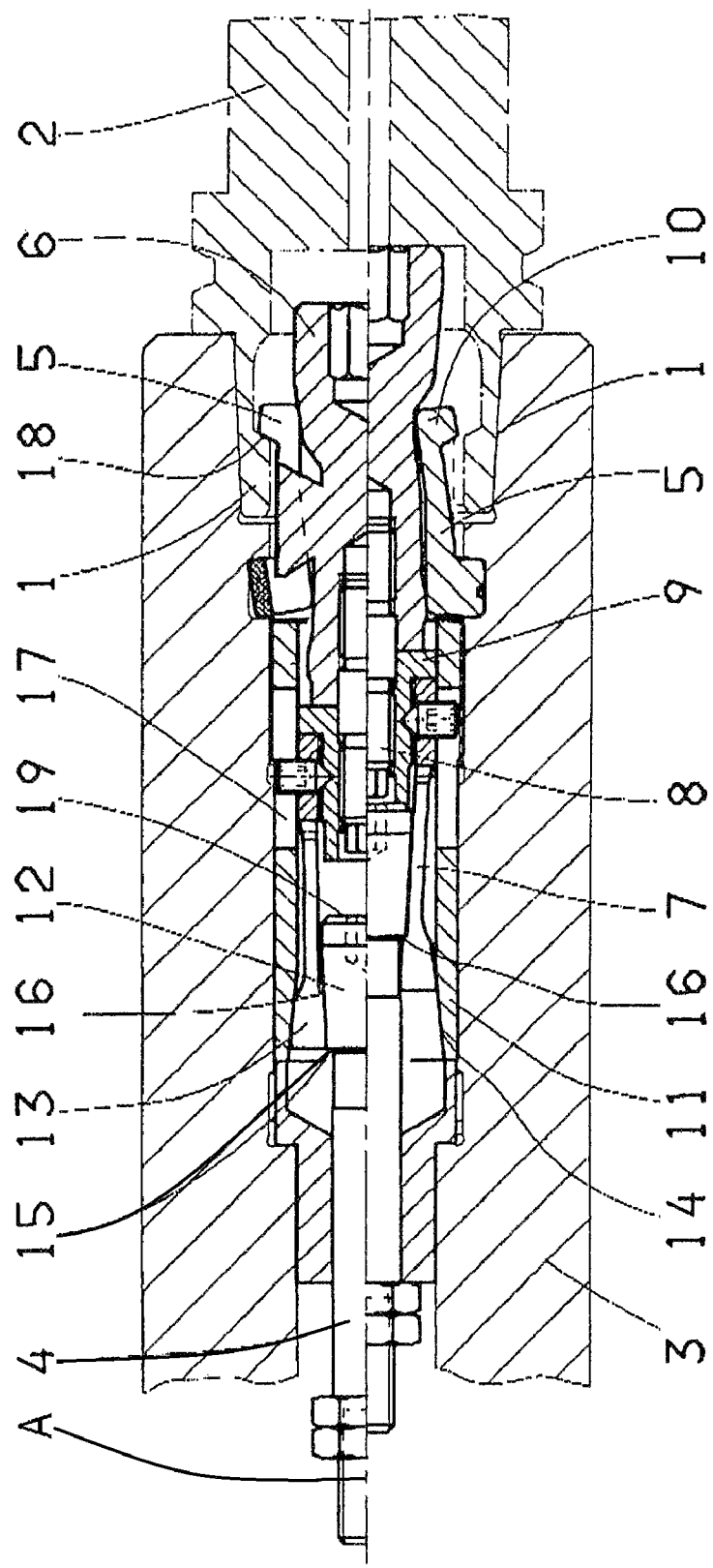

APPARATUS FOR CHUCKING A TOOL OR WORKPIECE HAVING A COLLET

CROSS REFERENCE TO RELATED APPLICATIONS

This application is the US-national stage of PCT application PCT/DE2006/001016, filed 14 Jun. 2006, published 22 Mar. 2007 as WO 2007/031045, and claiming the priority of German patent application 102005043722.2 itself filed 13 Sep. 2005 and PCT patent application PCT/DE2006/001016 itself filed 14 Jun. 2006, whose entire disclosures are herewith incorporated by reference.

FIELD OF THE INVENTION

The invention relates to an apparatus for holding a workpiece or tool having a hollow tapered collar or the like, the apparatus having a pull-back rod axially shiftable in a body for actuating a chuck head cooperating with jaws.

BACKGROUND OF THE INVENTION

The actuation of such an apparatus is carried out by axially moving the pull-back rod, it being tensioned for holding and compressed for releasing the holding of the workpiece or tool and shifting again into the releasing position. In order to hold the axial position of the pull-back rod in a holding position, it is common according to prior art to prestress it with a tension spring, usually using a stack of spring washers or bolt disk springs that press the pull-back rod into the holding position with great force and hold it in place even if tension is no longer applied to the pull-back rod. However, one disadvantage is that the balance of the rotating spindle of the machine tool supporting the apparatus is adversely affected by the stack of spring washers.

OBJECT OF THE INVENTION

The invention is therefore based on the object of providing an apparatus of the above-mentioned type in such a manner that the balance can be improved.

SUMMARY OF THE INVENTION

This object is attained according to the invention in an apparatus of the above mentioned type in that the axial position of the pull-back rod is maintained in a holding position in a self-locking manner without utilizing the force of a tension spring.

Such an apparatus provides the advantage that after the force has been applied, the tension can be released and the stored force will be stored by the self-locking action in the pull-back rod without requiring a tension spring. The balance of the rotating spindle of the machine tool is significantly improved, and higher rotational speeds can be achieved. Furthermore, this creates the advantage that assembly is simplified because the required components can be simply inserted into the body axially from the front without being obstructed by the tension spring.

It is especially preferred within the scope of the invention, if a holding sleeve is axially fixed on the body and axially guides a gripper whose inner face bears on the pull-back rod, and the pull-back rod has a tapered head, the gripper has a wedge ring, and the holding sleeve has a tapered inner surface. The tapered head, the wedge ring, and the tapered inner surface, created the required high holding force by axial relative displacement of the components involved to maintain the required security to safely clamp the workpiece or the tool at high rotation speeds.

It is further advantageous when the tapered head is stepped in toward the pull-back rod at a back-facing shoulder, the gripper has an front-facing shoulder for engaging the back-facing shoulder, and the gripper can spread and move past the back-facing shoulder with its front-facing shoulder in the axial region of the tapered inner surface of the holding sleeve. This configuration initially ensures that the axial displacement of the pull-back rod into the holding position is transmitted via the gripper as a large axial displacement of the chuck head to press the jaws against the tapered collar and produce the clamping effect, and movement of the pull-back rod along the wedge ring spreads the gripper outward and engages it with the tapered head. Although axial displacement of the gripper is reduced in this manner with a given axial stroke of the pull-back rod, self-locking action occurs, however, with increasing force, in that the wedge ring is literally wedged between the tapered head and the tapered inner surface of the holding sleeve. This position of the gripper is maintained even if axial tension on the pull-back rod is released so that the pull-back rod can rotate out of contact with the spindle of the machine tool and any actuating system.

It is further provided within the scope of the invention that the gripper is coupled to the chuck head for axial displacement thereof via a threaded bolt, as well as via a threaded ring. In principle, the possibility exists to allow the gripper to directly act upon the chuck head, such multi-part embodiment providing advantages with the use of the threaded bolt and the threaded ring with regard to the manufacture, installation, and coolant throughput.

In order to avoid any rotation of the gripper relative to the chuck head, which could lead to a lateral off-center position of the gripper resulting in the creation of an undefined holding force, the gripper is guided in a longitudinal slot of the holding sleeve.

It has proven advantageous within the scope of the invention, if the tapered head has an apex angle of 4° to 8°, particularly of 6°, since this angle advantageously meets the requirements for a sufficient axial displacement of the gripper during displacement of the pull-back rod when the gripper is pressed against the tapered inner surface of the holding sleevedfasdf.

This is facilitated, if the tapered inner surface of the holding sleeve has an apex angle of 9° to 15° particularly of 12°, whereby in this case the inner surface of the wedge ring purposefully has an angle corresponding to the apex angle of the tapered head, and the outer surface of the wedge ring has an angle corresponding to the apex angle of the holding sleeve for ensuring a large engagement surface.

Furthermore, it is advantageous if the tapered head has an engagement surface that comes bears on the threaded ring, if the front-facing shoulder of the gripper engages the back-facing shoulder of the tapered head. This configuration ensures that the gripper is moved jointly with the pull-back rod without any clearance from the releasing position into the holding position, i.e. the gripper engages the back-facing shoulder of the pull-back rod flush with its front-facing shoulder.

BRIEF DESCRIPTION OF THE DRAWING

In the following the invention is explained in greater detail with reference to an embodiment shown in the drawing; the sole FIGURE is a longitudinal section through the apparatus according to the invention.

DETAILED DESCRIPTION

The drawing shows an apparatus serving to hold a workpiece 2 or a tool having a frustoconically tapered collar 1, to which end the apparatus has a pull-back rod 4 that is displaceable along an axis A in a body 3 and that serves for actuating a chuck head 6 cooperating with jaws 5, namely by axial displacement of the pull-back rod 4 between a releasing position shown in the drawing in the bottom half and a holding position shown in the upper half of the drawing. For holding the workpiece 2 the pull-back rod 4 is pulled from the releasing position back into the holding position by an actuator not shown in the drawing, so that the chuck head 6 is axially displaced via a tong-like gripper 7, a threaded bolt 8, and a threaded ring 9, thus radially outwardly displacing the outer jaw ends 10 of the jaws 5 into engagement with the tapered collar 1.

It is important in the apparatus shown in the drawing that a holding sleeve 11 is axially fixed in the body 1 and axially guides the gripper 7 that bears with its inner faces on the pull-back rod 4 that has a tapered head 12, the gripper 7 having a radially spreadable wedge ring 13 and the holding sleeve 11 having a frustoconical inner surface 14 that on movement of the pull-back rod 4 from the releasing position into the holding position creates a self-locking action that maintains the axial position of the gripper 7 without even having to maintain tension on the pull-back rod 4 with the actuator. The force applied to the pull-back rod 4 by the actuator is therefore in effect stored by this self-locking mechanism, and the safe holding of the workpiece 2 at its tapered collar 1 is ensured without having to employ a tension spring that has to maintain the axial position of the pull-back rod 4 in the holding position with its tension against the body 3 or the holding sleeve 11. Such safe holding is therefore not compromised by any fatigue on the part of the tension spring. Furthermore, with the use of the self-locking mechanism provided by the invention the pull-back rod 4 is not engaged by a tension spring and can rotate with the spindle or the body 3 without having to be connected to its actuator so that balance is improved and rotational speed can be increased.

The drawing further shows that the tapered head 12 is stepped radially in at a back-facing shoulder 15 toward the pull-back rod 4, the gripper 7 has an front-facing shoulder 16 for engagement with the back-facing shoulder 15, and the gripper 7 may spread and pass the back-facing shoulder 15 with the front-facing shoulder 16 in the region of the tapered inner surface 14 of the holding sleeve 11. In the embodiment shown in the drawing the tapered head 12 has an apex angle of 6°, while the tapered inner surface 14 of the holding sleeve 11 has an apex angle of 12°. The angle of the inner surface, as well as that of the outer surface of the wedge ring 13 correspond to the angle of the respective confronting surfaces.

The operation of the apparatus is briefly explained below. Based on the releasing position shown in the bottom half, tension is applied to the pull-back rod 4 by the unillustrated actuator, by means of which the rod 4 is pulled back to the left in the drawing. This movement causes the pull-back rod 4 to engage the front-facing shoulders 16 of the gripper 7 on the back-facing shoulder 15 of the pull-back bolt 4 first to entrain the gripper 7 that, in order to avoid an imbalance is guided in two slots 17 of the tightening sleeve, and thus via the threaded bolt 8 and the threaded ring 9 entrains the head 6 so that the outer ends 10 of the jaws 5 pivot outward and engage a back-facing shoulder 18 of the tapered collar 1. The engagement of the back-facing shoulder 15 with the front-facing shoulder 16 effects a rapid axial movement of the chuck head 6 and after moving through a predetermined short axial stroke the front-facing shoulder 16 of the gripper 7 spreads and moves axially past the back-facing shoulder 15 while riding on the inner surface of the wedge ring 13 of the tapered head and simultaneously the outer surface of the wedge ring presses against the tightening sleeve 11. With continued axial movement of the pull-back rod 4, the gripper 7 is therefore entrained through a very short axial stroke and then is wedged between the tapered head 12 and the holding sleeve 11 with increased force, until the mechanism self-locks, thereby providing the desired tension even if the actuator is disconnected from the pull-back rod 4.

If the holding is to be released, the pull-back rod 4 is pushed left to right from the holding position into the releasing position, thus releasing the gripper 7 wedged between the tapered head 12 and the holding sleeve 11, and the pull-back rod 4 also moves relative to the gripper 7 until it engages the threaded ring 9 with its end 19, and the front-facing shoulder 16 can again engage behind the back-facing shoulder 15 of the pull-back rod 4. Continued movement of the pull-back rod 4 pushes the chuck head 6 so that the jaws 5 release the workpiece 2 with their outer jaw ends 10.

The invention claimed is:

1. A chuck for holding a tool or workpiece having a tapered mounting collar, the chuck comprising:
   a tubular spindle centered on and rotatable about an axis, the collar fittable in a front end of the spindle;
   a holding sleeve axially fixed in the tubular spindle and having a frustoconical inner surface;
   radially shiftable jaws in the spindle grippingly engageable with the collar fitted to the spindle and radially outwardly engageable with the holding sleeve;
   a rod axially shiftable in the spindle between a front releasing position and a rear holding position and having at a front end a tapered head that is stepped back toward the pull-back rod at a back-facing shoulder;
   a chuck head on the rod engageable with the jaws for spreading same and gripping the collar of the tool or workpiece with the jaws; and
   a gripper in the spindle having a wedge ring with an inner surface engaging the rod and a front-facing shoulder for engagement with the back-facing shoulder of the tapered head, the gripper being constructed to spread and pass the back-facing shoulder with the front-facing shoulder in the axial region of the frustoconical inner surface of the holding sleeve.

2. The apparatus according to claim 1 wherein the gripper is coupled to the chuck head for axially shifting it by a threaded bolt and a threaded ring.

3. The apparatus according to claim 1 wherein the gripper is guided in at least one longitudinal slot of the holding sleeve.

4. The apparatus according to claim 1 wherein the tapered head has an apex angle of 4° to 8°.

5. The apparatus according to claim 1 wherein the frustoconical inner surface of the holding sleeve has an apex angle of 9° to 15°.

6. The apparatus according to claim 4 wherein an inner surface of the wedge ring has an apex angle corresponding to an apex angle of the tapered head, and an outer surface of the wedge ring has an apex angle corresponding to an apex angle of the inner surface of the holding sleeve.

7. The apparatus according to claim 2 wherein the tapered head has a surface that is level with the threaded ring when the front-facing shoulder of the gripper engages behind the back-facing shoulder of the tapered head.

8. A chuck for holding a tool or workpiece having a tapered mounting collar, the chuck comprising:

a tubular spindle centered on and rotatable about an axis and having a radially inwardly directed frustoconical inner surface, the collar fittable in a front end of the spindle;

radially shiftable jaws in the spindle grippingly engageable with the collar fitted to the spindle;

a rod axially shiftable in the spindle between a front releasing position and a rear holding position and having a tapered head with frustoconical outer surface tapered oppositely to the spindle inner surface and an axially rearwardly directed back facing shoulder directed away from the jaws;

an axially shiftable cam head engageable with the jaws and coupled to the rod, the cam head engaging the jaws and forcing the jaws into radial holding contact with the collar in the holding position of the rod and disengaging from the jaws and releasing the collar in the releasing position of the rod; and self-locking means including a wedge having inner and outer faces riding respectively on the outer surface of the rod and the inner surface of the spindle and formed with an axially forwardly directed front facing shoulder engageable with the back-facing shoulder of the head for wedging the rod in the holding position when displaced from the releasing to the holding position.

9. The chuck defined in claim 8 wherein the wedge is axially fixed to the head and couples the head to the rod.

10. A chuck for holding a tool or workpiece having a tapered mounting collar, the chuck comprising:

a tubular spindle centered on and rotatable about an axis and having a radially inwardly directed frustoconical inner surface, the collar fittable in a front end of the spindle;

radially shiftable jaws in the spindle grippingly engageable with the collar fitted to the spindle;

a rod axially shiftable in the spindle between a front releasing position and a rear holding position and having a frustoconical outer surface tapered oppositely to the spindle inner surface;

an axially shiftable cam head engageable with the jaws and coupled to the rod, the cam head engaging the jaws and forcing the jaws into radial holding contact with the collar in the holding position of the rod and disengaging from the jaws and releasing the collar in the releasing position of the rod; and self-locking means including a wedge having inner and outer faces riding respectively on the outer surface of the rod and the inner surface of the spindle for wedging the rod in the holding position when displaced from the releasing to the holding position, the wedge having a front end provided with a threaded bolt and ring fixed to the head.

11. A chuck for holding a tool or workpiece having a tapered mounting collar, the chuck comprising:

a tubular spindle centered on and rotatable about an axis and having a radially inwardly directed frustoconical inner surface, the collar fittable in a front end of the spindle;

radially shiftable jaws in the spindle grippingly engageable with the collar fitted to the spindle;

a rod axially shiftable in the spindle between a front releasing position and a rear holding position and having a frustoconical outer surface tapered oppositely to the spindle inner surface;

an axially shiftable cam head engageable with the jaws and coupled to the rod, the cam head engaging the jaws and forcing the jaws into radial holding contact with the collar in the holding position of the rod and disengaging from the jaws and releasing the collar in the releasing position of the rod;

self-locking means including a wedge having inner and outer faces riding respectively on the outer surface of the rod and the inner surface of the spindle for wedging the rod in the holding position when displaced from the releasing to the holding position; and an axially extending guide formation fixed relative to the spindle, the wedge having a radial projection engaged in the guide formation and preventing rotation of the wedge in the spindle.

12. The chuck defined in claim 11 wherein the spindle includes an axially and angularly fixed lining sleeve forming the guide formation and the inner surface.

13. The chuck defined in claim 8 wherein the outer surface of the tapered head has an apex angle of 4° to 8°.

14. The chuck defined in claim 8 wherein the outer surface has an apex angle of 9° to 15°.

15. The chuck defined in claim 8 wherein one of the inner and outer surfaces have apex angles substantially identical to apex angles of the outer and inner faces of the wedge.

16. The chuck defined in claim 8 wherein the rod has an front end face axially operatively engageable with a rear face of the head.

* * * * *